United States Patent Office 3,413,215
Patented Nov. 26, 1968

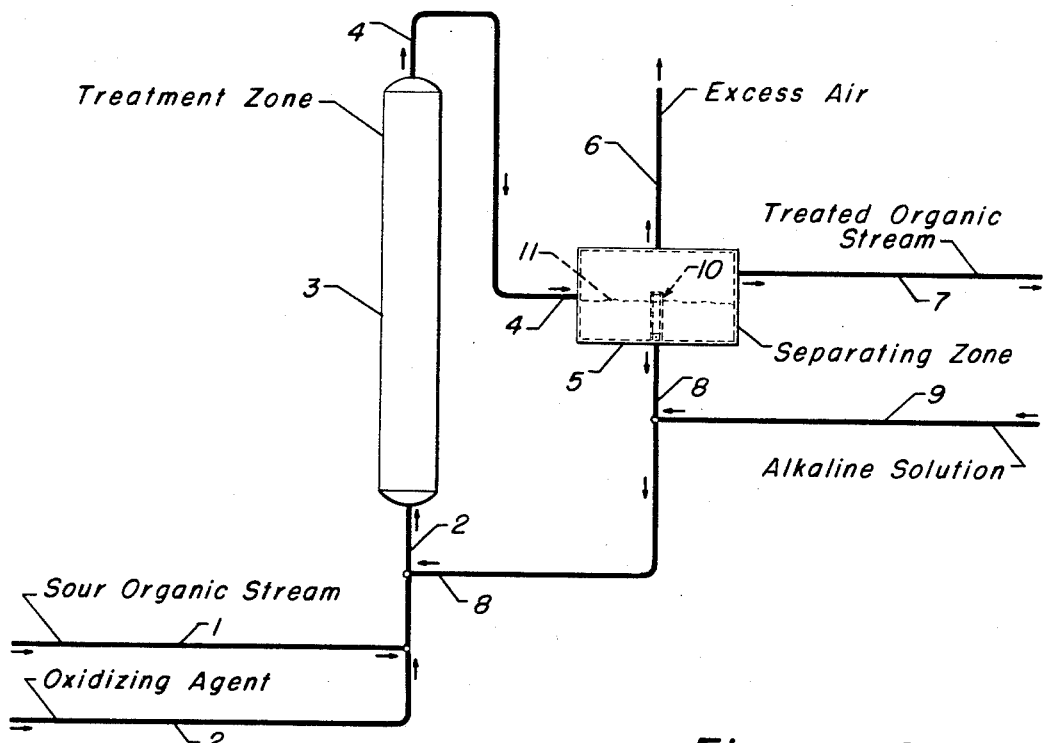
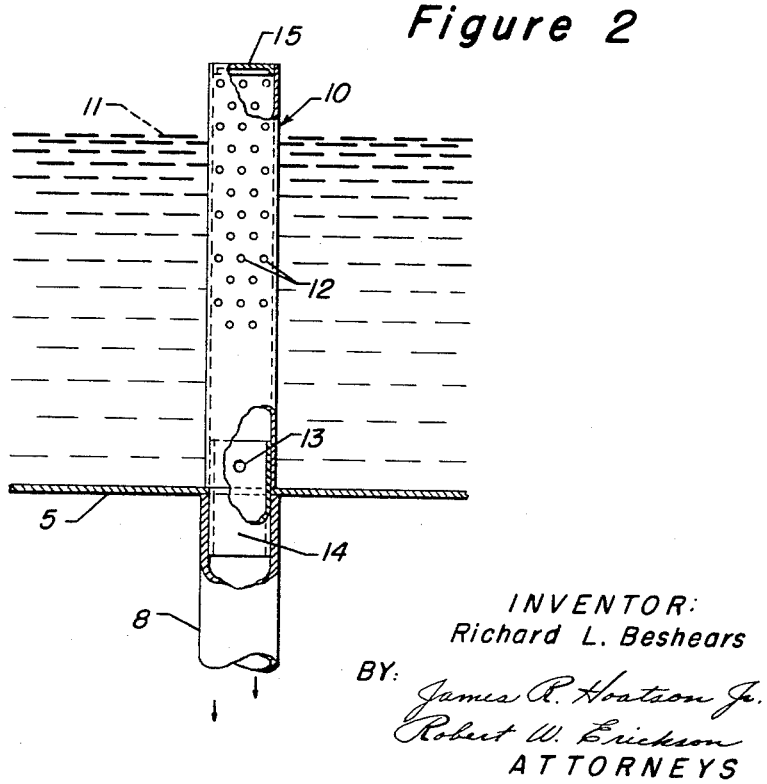

3,413,215
OXIDATION OF MERCAPTO COMPOUNDS
Richard L. Beshears, Tarzana, Calif., assignor to Universal Oil Products Company, Des Plaines, Ill., a corporation of Delaware
Filed May 16, 1966, Ser. No. 550,491
6 Claims. (Cl. 208—206)

ABSTRACT OF THE DISCLOSURE

In the process of oxidizing a mercapto compound with air in contact with a phthalocyanine catalyst in an alkaline environment, wherein the oxidation effluent is passed to a phase separation zone from which an alkaline phase containing the catalyst is recovered, it was observed that the phthalocyanine catalyst, in a complex form, accumulates at the phase separation interface between organic and alkaline phases. To improve catalyst recovery, the invention herein comprises withdrawing liquid directly from the interfacial region and admixing it with recovered alkaline phase whereby to increase catalyst concentration therein.

---

The subject of the present invention is an improved process for the oxidation of mercapto compounds. More precisely, the present invention encompasses a process for the oxidation of mercapto compounds which may be contained in an organic or an alkaline stream, which process is designed to effectively and efficiently utilize a solution of phthalocyanine catalyst, employing for this purpose a special recovery procedure for a newly elucidated source of catalyst loss in the system. The conception of this invention was facilitated by the recognition that a complex compound tends to form during the mercapto compound oxidation process, apparently as an intermediate in the complicated reactions involved in the mechanism associated with the overall oxidation reaction. This complex is believed to be the result of coordinate covalent bonding between mercaptide ions and the metallic phthalocyanine catalyst. As such, it possesses elements that are hydrophilic and elements that are hydrophobic. This diversity of elements tends to give this complex a surface active nature. This surface active nature in turn tends to allow a portion of the catalyst that passes through the oxidizing zone to collect at the interface between the organic and alkaline phases in the separating zone associated with the oxidation zone, as will be hereinafter explained. This interface then, constitutes a "sink" for the catalyst. Therefore, in essence, the present invention involves withdrawal of liquid directly from the interface between an organic phase and an alkaline phase that forms in a separating zone associated with a mercapto compound phthalocyanine oxidation process, and admixture of the resultant withdrawn stream with a recovered alkaline stream thereby increasing the catalyst concentration therein.

Traditionally, in the petroleum and chemical industries, the removal of mercaptans from various streams and materials has been a substantial problem. Reasons for desiring this removal are so well-known in the art, that it would be needless repetition to consider them in detail here. Nevertheless, some of the ramifications of their presence in the streams or material are: corrosion problems, burning problems, catalytic poisoning problems, undesired side reaction problems, offensive odor problems, etc.

The methods that have been proposed for the solution of this mercaptan removal problem can be catagorized into those that seek absolute removal of the mercaptan compound or any derivative thereof from the carrier stream or material, and those that seek only to convert the mercaptan into a less harmful derivative. Processes of the former type are generally labeled as "extraction" processes. Processes of the latter type are generally labeled as "sweetening" processes. In either category, the consensus of the art at present is that a preferential means for removing or transforming these objectionable compounds is an oxidation process designed to transform these compounds at least in part to disulfides. This oxidation process is applied directly to the stream containing the undesired mercapto compounds when it is used in a sweetening operation. On the other hand, the oxidation process is employed in the extraction processes, not on the sour organic stream, but on the extract stream from the extraction zone in a regeneration operation designed to revitalize this alkaline extract stream. Prominent among the available oxidation processes is one that involves the utilization of a phthalocyanine catalyst and an oxidizing agent in order to perform the desired transformation.

In the utilization of this phthalocyanine process to oxidize mercapto compounds, I have noted that some difficulty is experienced with conservation of catalyst when a solution of phthalocyanine catalyst is employed. It is not that such a process is not operable because of this degradation in catalyst concentration in the oxidation zone; it is more a question of efficient utilization of the catalyst. Specifically, I have now determined that the observed loss of catalyst from the process is substantially caused by the formation of a phthalocyanine catalytic complex as an intermediate in the mechanism of the reaction. A portion of this complex is carried out of the oxidation zone in the effluent from said zone, passes into a separating zone associated with the oxidation zone, as will be hereinafter explained, and there collects at the interface between an alkaline and organic phase that forms in this separating zone. Hence, not all of the observed loss of a catalyst is unrecoverable. And I now propose that a substantial portion of liquid be withdrawn directly from the interface between these two phases and be recirculated with the alkaline phase thereby substantially eliminating this source of catalyst loss. Thus, I find that lower levels of catalyst concentration in the reaction zone and longer intervals between catalyst addition to the system are possible with the process of the present invention. This obviously is advantageous because of the cost of catalyst and of the inconvenience associated with the frequent catalyst addition operations. Furthermore, I find that the probability of unrecoverable loss of catalyst via entrainment in the organic phase effluent from the separating zone is substantially reduced by the process of the present invention, since it minimizes the catalyst concentration in the organic portion of the zone of interface between phases in the separating zone.

Therefore, it is a principal object of the present invention to provide a process that makes efficient and effective use of a solution of phthalocyanine catalyst in the oxidation of a mercapto compound. A corollary objective is to improve a mercapto oxidation process that employs a solution of phthalocyanine catalyst by substantially eliminating a source of catalyst loss from the process.

In a broad embodiment, the present invention involves an improved method of operation of a continuous process for oxidizing a mercapto compound, wherein a stream containing a mercapto compound is contacted, in an oxidizing zone, with an oxidizing agent in an alkaline environment and in contact with a phthalocyanine catlyst at oxidizing conditions effecting the conversion of at least a portion of said mercapto compound to disulfide, wherein the effluent from the oxidizing zone is passed to a separating zone in which an organic phase separates from an alkaline phase containing phthalocyanine catalyst, wherein a phthalocyanine catalytic complex collects at the interface between said organic and alkaline phases, and wherein the said alkaline phase is recovered for further use; the improved method of operation comprises withdrawing a liquid portion from the interface between said organic phase and said alkaline phase, and admixing said portion with said recovered alkaline phase thereby increasing the catalyst concentration therein.

In another broad embodiment, the present invention involves an improved method of operation of a continuous process for sweetening a sour organic stream, wherein an organic stream containing a mercaptan component is contacted, in a sweetening zone, with an oxidizing agent and with an alkaline solution of a phthalocyanine catalyst at oxidizing conditions effecting conversion of at least a portion of said mercaptan component to disulfide, wherein the effluent from the sweetening zone is passed to a separating zone in which an organic phase separates from an alkaline phase containing phthalocyanine catalyst, wherein a phthalocyanine catalytic complex collects at the interface between the said organic and alkaline phases, and wherein the said alkaline phase is recycled to said sweetening zone to admix said sour organic stream; the improved method of operation comprises withdrawing a liquid portion from the interface between said organic and alkaline phases and admixing said portion with said recycled alkaline phase thereby increasing the concentration of catalyst therein.

In still another broad embodiment, the present invention relates to an improved method of operation of a continuous process for regenerating an alkaline extract stream containing a mercaptide component, wherein an alkaline stream containing a mercaptide component and a phthalocyanine catalyst is contacted in a regeneration zone, with an oxidizing agent at oxidizing conditions effecting the conversion of at least a portion of said mercaptide component to disulfide, wherein the effluent from the regeneration zone is passed to a separating zone in which an organic disulfide phase separates from an alkaline phase containing phthalocyanine catalyst, wherein a phthalocyanine catalytic complex collects at the interface between said organic and alkaline phases and wherein said alkaline phase is recovered for further use in an extraction zone; the improved method of operation comprises withdrawing a liquid portion from the interface between said organic and alkaline phases and admixing said portion with said recovered alkaline phase thereby increasing the catalyst concentration therein.

In a more limited embodiment, the present invention relates to an improvement in a continuous process for oxidizing a mercapto compound wherein a stream containing a mercapto compound is contacted, in an oxidizing zone, with an oxidizing agent in an alkaline envirnment and in contact with a phthalocyanine catalyst at oxidizing conditions effecting the conversion of at least a portion of said mercapto compound to disulfide, wherein the effluent from the oxidizing zone is passed to a separating zone in which an organic phase separates from an alkaline phase containing phthalocyanine catalyst, wherein a phthalocyanine catalytic complex collects at the interface between said organic and alkaline phases, and wherein said alkaline phase is recovered for further use; the improvement comprises adding to the separating zone at least one vertical cylindrical capped drain tube, extending up from the lower discharge port of said separating zone through the alkaline phase and into the organic phase, having a plurality of orifices arranged on the upper portion of said tube such that a portion of said orifices are in the organic phase and a portion are in the alkaline phase, whereby a substantial portion of said phthalocyanine catalytic complex passes into the recovered alkaline phase with resultant increase in catalyst consentration therein.

Other specific embodiments of this invention relate to particularly preferred process conditions and mechanisms of effecting process. These will be hereinafter discussed in a detailed explanation of the invention which is contained in the description of the elements, conditions and mechanisms that can be employed in the practice of the various embodiments of the present invention that is coupled with a description of one paraicular embodiment of the present invention which is illustrated in the attached drawing.

Without limiting the scope and spirit of the appended claims by this explanation, it appears that the observed loss of phthalocyanine catalyst from a mercapto oxidation process is primarily caused by the formation of a catalytic complex between, I believe, mercaptide ions and the metallic phthalocyanine catalyst. This complex forms as an intermediate compound in the complex reaction mechanism governing the overall oxidation reaction. As such, a portion of the complex decomposes to give disulfide and the original phthalocyanine molecule, but the kinetics of the decomposition reaction are apparently such that this final step only happens in the presence of an oxidizing agent and appears to be a significant rate controlling step. Accordingly, in the operation of continuous process wherein the complex and the oxidation agent are only in contact for a finite period of time, a portion of this complex tends to be unreacted after passage of the stream through the oxidizing zone and is carried over to the separating zone. Since the complex has a mercaptide portion, which is organic in nature, and a phthalocyanine portion which is polar in nature, it tends to be very surface active. This ambivalence causes it to collect at the interface between phases in the separating zone which interfacial zone in general, is a stationary region. Therefore, the catalyst tends, over a period of time to concentrate at the interface and to be effectively lost to the process.

Before considering in detail the various ramifications of the present invention, it is convenient to define several of the terms and phrases used in the specification and in the appended claims. In those instances where temperatures are given to boiling ranges and boiling points, it is understood that they have reference to those which are obtained through the use of Standard ASTM Distillation methods. The phrase "gasoline boiling range" as used herein refers to a temperature range having an upper limit of about 400° F. to about 425° F. Included within the gasoline boiling range would be selected fractions of full boiling range gasolines commonly referred to as "naphthas" which generally have an initial boiling point of from about 150° F. to about 250° F. and an end boiling point of from about 350° F. to about 425° F. The term "middle distillate range" is intended to refer to a temperature above the gasoline range but having an upper limit of about 650° F.—included within this range would be fractions that are called in the industry, heavy naphthas, burner oils, fuel oils, diesel fuels, jet fuels, etc. The term "kerosene" would also be a special case of middle distillate range oil having an initial boiling point of about 300° F. to about 400° F., and an end boiling point of about 475° F. to about 550° F. The term "sweetening" as used herein denotes the process of treating a sour hydrocarbon fraction with an oxidizing agent at conditions designed to effect the oxidation of mercaptans to disulfides which are compounds of comparatively sweet odor. The term "hydrocarbon fraction or distillate" is intended to refer to a portion of a petroleum crude oil, of a mixture of hydrocarbons, of a coal tar distillate, etc., that boils within a given temperature range. The term "polar molecule" refers to molecules which are characterized by a slight separation of the center of density of the positive charges and of the negative charges which gives rise to an electrical dipole; as a result of this dipole, molecules which approach each other closely enough and with the proper orientation tend to adhere, the ends of unlike charges attracting each other. The term "surface active material" is used herein to refer to a material that consists of molecules that have a portion which is oil-soluble and a portion which is water-soluble or polar. The term "mercapto compound" is used here to describe the sulfhydryl-group-containing compounds and their derivatives such as hydrogen sulfide, the alkyl compounds—such as mercaptans and mercaptides, and aryl compounds—such as thiophenol and the thiophenolates. The term "sink" (the antithesis of "source") refers to a region of the system or process in which the quantity of interest disappears from the system; for example, a "sink" for heat would be a large body of water.

The mercapto compound which is acted on by the process of the present invention can be any mercapto compound which it is desired to convert to disulfide. For instance, the mercapto compound may be present as an alkaline solution of a particular mercaptan such as tertiary butyl mercaptan which it is desired to oxidize to tertiary butyl disulfide in acceptable yields. More commonly, the mercapto compound is present in an organic stream and it is desired to oxidize mercaptans to disulfides in order to sweeten the organic stream. This organic input stream is generally a hydrocarbon fraction or distillate. These may include: normally gaseous hydrocarbons, gasolines, naphthas, gas oils, kerosene, jet fuel, stove oil, range oil, burner oil, fuel oil, etc. Still another kind of input stream is one produced by an alkaline extraction operation on one of the organic streams mentioned above, which generally is designed to remove acidic components such as mercaptans, from the organic stream. Such a stream from an extraction operation contains mercaptides (i.e. a salt of a mercaptan) and it is generally desired to oxidize these mercaptides to disulfides in order to regenerate the alkaline stream. It is understood that all of the above streams may constitute input streams to the process of the present invention.

The present invention may be more clearly understood by reference to the accompanying drawing which illustrates one particular embodiment thereof. It is not intended, however, that the process of the present invention be unduly limited to the embodiment illustrated. The embodiment illustrated is a sweetening embodiment but it is to be emphasized that the description applies in general with equal force to a regeneration embodiment as will be hereinafter explained. In the drawing, various flow valves, control valves, coolers, pumps, compressors, etc., have either been eliminated or greatly reduced in number as not being essential to the complete understanding of the present process. The utilization of such miscellaneous items will immediately be recognized by one possessing the requisite skill within the art of petroleum processing techniques.

FIGURE 1 of the drawing is a flow chart delineating a sweetening embodiment of the present invention; and FIGURE 2 is a blowup of the separating zone of FIGURE 1 illustrating one possible means of withdrawing the interfacial zone within the separator and admixing it with the recycled alkaline phase.

Referring now to FIGURE 1 of the drawing, the sour organic stream enters the process through line 1, an oxidation agent is introduced through line 2, and an alkaline solution containing a phthalocyanine catalyst is recycled by way of line 8. The mixture is passed by way of line 2 into treatment zone 3. When desired, the sour organic stream, the oxidizing agent, and the alkaline solution containing phthalocyanine catalyst can be introduced separately to treatment zone 3. In still another embodiment not illustrated in the drawing, downward flow instead of upward flow may be utilized in the treatment zone. Additionally, countercurrent instead of concurrent flow may be utilized in the treatment zone.

The phthalocyanine catalyst is present within treatment zone 3 as a solution or suspension in the recycled alkaline stream.

Any suitable phthalocyanine catalyst is used in the present invention and preferably comprises a metal phthalocyanine. Particularly preferred metal phthalocyanines comprise cobalt phthalocyanine and vanadium phthalocyanine. Other metal phthalocyanines include iron phthalocyanine, copper phthalocyanine, nickel phthalocyanine, chromium phthalocyanine, etc. The metal phthalocyanine in general is not highly polar and, therefore, for improved operation is preferably utilized as a polar derivative thereof. A preferred polar derivative is the sulfonated derivative. Thus, a particularly preferred phthalocyanine catalyst comprises cobalt phthalocyanine sulfonate. Such a catalyst comprises cobalt phthalocyanine disulfonate and also contains cobalt phthalocyanine monosulfonate. Another preferred catalyst comprises vanadium phthalocyanine sulfonate. These compounds may be obtained from any suitable source or may be prepared in any suitable manner as, for example, by reacting cobalt or vanadium phthalocyanine with 20% fuming sulfuric acid. While the sulfonic acid derivatives are preferred, it is understood that other suitable derivatives may be employed. Other derivatives include particularly the carboxylated derivative which may be prepared, for example, by the action of trichloroacetic acid on the metal phthalocyanine or by the action of phosgene and aluminum chloride. In the latter reaction the acid chloride is formed and may be converted to the desired carboxylated derivative by conventional hydrolysis.

The phthalocyanine catalyst is used, as mentioned hereinbefore, as a solution or suspension of the catalyst in an alkaline solution. As such the catalyst is present in the alkaline solution in the range of from about 1 to 1000 p.p.m. and preferably from about 5 to about 500 p.p.m. by weight of the solution.

In the case illustrated in FIGURE 1 of the drawing, treating of the sour organic stream is effected in the presence of an alkaline reagent. Any appropriate alkaline reagent may be employed. A preferred reagent comprises an aqueous solution of an alkali metal hydroxide such as sodium hydroxide solution, potassium hydroxide solution, etc. Other alkaline solutions include aqueous solutions of lithim hydroxide, cesium hydroxide, etc.—although in general, these hydroxides are more expensive and therefore are not preferred for commercial use. A particularly preferred alkaline solution is an aqueous solution of from 1 to about 50% by weight concentration of sodium hydroxide, and more preferably the sodium hydroxide concentration is within the range of about 4% to about 25% by weight concentration.

The oxidizing agent that enters treatment zone 3 via line 2, is preferably air, but it is to be understood that any other suitable oxidizing agent may be employed, including oxygen or other oxygen containing gases. In some cases a solid hydrocarbon distillate may contain entrained oxygen or air in sufficient concentrations to accomplish the desired treating, but generally it is preferred to introduce air into the treating zone. The amount of air must be sufficient to effect oxidation of the mercaptans, although an excess thereto is generally not objectionable. Therefore, the amount of air that will be injected into treatment zone 3 in the preferred embodiment will generally range from about 10% of the volume of the sour organic stream entering through line 1 to about 400% of the sour organic stream and preferably from about 20% to about 200% by volume of said sour organic stream.

Treatment of the sour organic stream in zone 3 is generally effected at ambient temperatures (50° F. to 100° F.), although elevated temperatures may be used and generally will not exceed about 400° F. Atmospheric pressure can be employed, although superatmospheric pressure up to about 1000 pounds per square inch or more may be employed if desired. The time of contact in the treatment zone will be set to give the desired reduction in mercaptan content and may range from about 1 minute to about two hours or more, depending upon the size of the treatment zone, the amount of catalyst therein and the particular hydrocarbon distillate being treated.

The effluent from treatment zone 3 is withdrawn through line 4 and passed into sepaarting zone 5. Excess air is removed from separating zone 5 via line 6. In separating zone 5 a phase separation takes place and the treated hydrocarbon distillate is withdrawn via line 7 and is recovered as the desired product of the process. The alkaline solution containing catalyst is withdrawn from zone 5 through line 8, and preferably at least a portion thereof is recycled by way of line 8 into treatment zone 3 for further use therein. Fresh alkaline solution may be added to the process via line 9. Also additional phthalocyanine catalyst may be introduced into the process via line 9.

As mentioned hereinbefore, it is an essential feature of the present invention that sepaarting zone 5 have means incorporated in it to allow the withdrawal of liquid directly from the interface between the organic and alkaline phases that form in this zone. There are several possible mechanisms that can be employed for this purpose including for example, a side-cut from the separator, various forms of riser tubes extending from the alkaline phase outlet port up to the interface between the phases, etc. It is understood that the present invention is intended to cover all of these possible mechanisms.

A pariculary preferred means of accomplishing the objective of withdrawing liquid from the interface between the phases is illustrated in FIGURE 2 of the drawing. This figure represents a blowup of a drain tube which is shown in FIGURE 1 within the confines of the separating zone 5. In FIGURE 1, drain tube 10 is shown as extending up from the alkaline phase exit port through the alkaline phase through phase separation 11, and into the organic phase.

FIGURE 2 shows a preferred confignration for this drain tube. As can be seen, it consists of vertical cylindrical tube having: a sleeve 14 holding it upright and joining it to the alkaline phase exit port, a cap 15 which excludes the upper regions of the organic phase, a plurality of orifices 12 arranged on the upper portion of the tube, and at least one orifice 13 in the lower portion designed to extract the bottom portion of the alkaline phase.

The phase boundary 11 is controlled by means of a suitable level control device not shown, such that about 5% to about 30% and preferably 15% to 25% of the orifices are within the organic phase. These orifices are, in the preferred embodiment, of equal cross-sectional area and are present in sufficient number such that their total cross-sectional area aggregates to about 0.5 to about 4.0 and preferably 2.5 times the cross-sectional area of the drain tube 10.

The vertical capped cylindrical drain tube 10 functions within separating zone to withdraw liquid directly from the interface between the phases via its plurality of orifices 12, and admixes this stream with the alkaline phase which is withdrawn through orifices such as the one shown at 13 such that a stream rich in catalyst concentration is recycled to treatment zone 3, via line 8 and line 2.

It is to be emphasized that when the process of the present invention is employed to regenerate an alkaline extract stream the flow scheme is typically as follows: an alkaline solution containing phthalocyanine catalyst countercurrently contacts a sour organic stream in an extraction zone; the resultant alkaline extract solution containing phthalocyanine catalyst and mercaptide flows to a regeneration zone where it is contacted with an oxidizing agent; the effluent from the regeneration zone flows to a separating zone in which an organic phase consisting substantially of disulfides separates from the alkaline solution; and the alkaline solution is recycled to the extraction zone.

The catalyst, reagents, concentration of materials, and process conditions previously mentioned with reference to the sweetening embodiment apply generally to the regeneration embodiment.

Since the mechanism of the reaction is the same for both the sweetening and regeneration embodiment, the phthalocyanine catalytic complex will form in both and be carried over to the separating zone, with resultant complication as previously explained. Accordingly, the present invention is used in the same fashion in the regeneration embodiment as for the sweetening embodiment.

It is to be noted that in some regeneration embodiments it is necessary to add a light naphtha or other light oil to the effluent from the regeneration zone in order to hasten coalescence of the disulfides. When this is the case, the advantages of the present invention are even more pronounced since the naphtha tends also to hasten the transportatioin of the complex to the interface between the phases.

It is to be kept in mind that the exact selection of the particular variables of this process are at least partially dependent upon the physical and/or chemical characteristics of the input stream being subjected to the present process and as such have to be individually determined for each particular-type of input stream.

The following examples are given to illustrate further the process of the present invention, and indicates the benefits to be afforded by the utilization thereof. It is understood that the examples are given for the sole purpose of illustration and are not considered to limit the generally broad scope and spirit of the appended claims.

EXAMPLE I

A commercial light naptha having a mercaptan sulfur content of 150 p.p.m. to 200 p.p.m. by weight was contacted in a sweetening zone with air and a caustic solution containing 125 p.p.m. by weight of cobalt phthalocyanine sulfonate. The effluent from the sweetening zone was passed to a separating zone from which an organic phase was withdrawn and found to be sweet to the doctor test. During the course of run it was necessary to add, periodically cobalt phthalocyanine disulfonate to the caustic solution in order to maintain product quality.

The sweetening process was then shut down and a vertical cylindrical capped drain tube, similar to the one illustrated in the attached drawing, was installed in the separating zone of the process. A commercial light naphtha having a mercaptan sulfur content of 300 p.p.m. to about 400 p.p.m. by weight was then charged to the sweetening zone in admixture with air and an alkaline solution containing 10 p.p.m. by weight of cobalt phthalocyanine sulfonate.

It is to be emphasized that this naphtha contained approximately twice the mercaptan sulfur as the naphtha mentioned above; and, in addition, the catalyst concentration was reduced by an order of magnitude (i.e. a factor of 10). The effluent from the sweetening zone was then passed to the separating zone containing the vertical cylindrical capped drain tube as illustrated in FIGURE 2 of the attached drawing. The liquid level in the separator was controlled by a suitable level control device such that approximately 25% of the orifices on the drain tube were in the organic phase. An organic phase effluent from the separating zone was recovered and found to be doctor sweet. During the run, which was of approximately of the same duration as the run reported above, it was found that it was not necessary to add any catalyst makeup to the caustic stream.

Accordingly, this example illustrates the substantial improvement in catalyst effectiveness, in this case a reduction of catalyst concentration of the order of a factor of 10 while performing a more difficult sweetening job, that accompanies the utilization of the process of the present invention is a typical sweetening embodiment.

EXAMPLE II

The catalyst that is utilized in this example is cobalt phthalocyanine sulfonate that is added to a 10% by weight caustic solution in sufficient quantities to yield a solution of 50 p.p.m. catalyst by weight. The resultant caustic solution is countercurrently contacted in a vertical extraction zone with a cracked gasoline having a total sulfur content of 0.096% by weight and a mercaptan sulfur content of 0.045% by weight. The extraction is effected at 100° F. and 100 p.s.i.g. The caustic solution containing mercaptides is removed from the bottom of the extraction zone. This rich caustic solution after heating to 125° F. is charged to a regeneration zone wherein it is contacted with a steam of air. The regeneration zone is maintained at a temperature of 125° F. and a pressure of 50 p.s.i.g. The time of contact of the caustic stream containing the mercapto compounds is 10 minutes.

The effluent from the regeneration zone then passes to a disulfide separator, which may be packed with steelwool to allow coalesence of the disulfides or in which a light naphtha may be introduced to extract the disulfides. In either case, a phase separation takes place in the separator with the disulfides predominating in the organic phase. The separator is fitted with a vertical cylindrical capped drain tube which extends from the caustic solution exit port up into the organic phase. The liquid level is maintained in the separator by means of a suitable level control device such that approximately 25% of the orifices on the drain tube are in the disulfide phase. The caustic phase, which is admixed with liquid from the interface between the phases because of the interface withdrawal action of the drain tube, is withdrawn and recycled to the extraction zone. The concentration of catalyst in the withdrawn caustic is at least 50% greater than it would be under similar conditions but without the drain tube. Also the amount of catalyst that must be added periodically to maintain regeneration activity is sharply reduced.

Hence, this example illustrates the substantial improvement of the present invention when used in an extraction embodiment.

I claim as my invention:

1. In a continuous process for oxidizing a mercapto compound, wherein a stream containing said mercapto compound is contacted, in an oxidizing zone, with an oxidizing agent in an alkaline environment and in contact with a phthalocyanine catalyst at oxidizing conditions effecting the conversion of at least a portion of said mercapto compound to disulfide, wherein the effluent from the oxidizing zone is passed to a phase separation zone in which a liquid organic phase separates from a liquid alkaline phase containing phthalocyanine catalyst and in which a phthalocyanine catalytic complex collects at the interface between said organic and alkaline phases, the improved method of operation which comprises withdrawing a first liquid portion from a locus immediately above said interface, simultaneously withdrawing a second liquid portion from a locus immediately below said interface and below said first-mentioned locus, combining said first and second portions and recycling the resulting combined stream to said oxidation zone.

2. The process of claim 1 further characteried in that said stream containing a mercapto compound is a sour organic stream.

3. The process of claim 2, further characterized in that said sour organic stream is a gasoline fraction.

4. The process of claim 1 further characterized in that said phthalocyanine catalyst is selected from the group consisting of cobalt phthalocyanine sulfonates and vanadium phthalocyanine sulfonates.

5. In a continuous process for sweetening a sour organic stream, wherein said organic stream containing a mercaptan component is contacted, in a sweetening zone, with an oxidizing agent and an alkaline solution of phthalocyanine catalyst at oxidizing conditions effecting the conversion of at least a portion of said mercaptan component to disulfide, wherein the effluent from the sweetening zone is passed to a phase separation zone in which a liquid organic phase separates from a liquid alkaline phase containing phthalocyanine catalyst and in which a phthalocyanine catalytic complex collects at the interface between said organic and alkaline phases, and wherein the said alkaline phase is recycled to said sweetening zone to admix with said sour organic stream, the improved method of operation which comprises withdrawing a first liquid portion from a locus immediately above said interface, simultaneously withdrawing a second liquid portion from a locus immediately below said interface and below said first-mentioned locus, and admixing said first and second portions with said recycled alkaline phase thereby increasing the concentration of catalyst therein.

6. In a continuous process for regenerating an alkaline extract stream containing a mercaptide component, wherein said alkaline stream containing a mercaptide component and a phthalocyanine catalyst is contacted in a regeneration zone, with an oxidizing agent at oxidizing conditions effecting the conversion of at least a portion of said mercaptide component to disulfide, wherein the effluent from the regeneration zone is passed to a phase separation zone in which a liquid organic disulfide phase separates from a liquid alkaline phase containing phthalocyanine catalyst and in which a phthalocyanine catalytic complex collects at the interface between said organic and alkaline phases, and wherein said alkaline phase is recovered for further use in an extraction zone, the improved method of operation which comprises withdrawing a first liquid portion from a locus immediately above said interface, simultaneously withdrawing a second liquid portion from a locus immediately below said interface and below said first-mentioned locus, and admixing said first and second portions with said recovered alkaline phase thereby increasing the catalyst concentration therein.

References Cited

UNITED STATES PATENTS

| 2,882,224 | 4/1959 | Gleim et al. | 208—206 |
| 2,921,021 | 1/1960 | Urban et al. | 208—206 |
| 3,128,245 | 4/1964 | Zimmerman | 208—207 |
| 3,130,148 | 4/1964 | Gleim | 208—206 |

DELBERT E. GANTZ, *Primary Examiner.*

G. J. CRASANAKIS, *Assistant Examiner.*